US011887768B2

(12) United States Patent
Kim et al.

(10) Patent No.: US 11,887,768 B2
(45) Date of Patent: Jan. 30, 2024

(54) COIL COMPONENT

(71) Applicant: SAMSUNG ELECTRO-MECHANICS CO., LTD., Suwon-si (KR)

(72) Inventors: Hyung Ho Kim, Suwon-si (KR); Hyeon Yu Song, Suwon-si (KR); Jae Kwang Kim, Suwon-si (KR); Byung Kug Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 336 days.

(21) Appl. No.: 16/942,002

(22) Filed: Jul. 29, 2020

(65) Prior Publication Data

US 2021/0225576 A1 Jul. 22, 2021

(30) Foreign Application Priority Data

Jan. 17, 2020 (KR) ........................ 10-2020-0006393

(51) Int. Cl.
*H01F 5/00* (2006.01)
*H01F 27/255* (2006.01)
(Continued)

(52) U.S. Cl.
CPC ......... *H01F 27/255* (2013.01); *H01F 17/045* (2013.01); *H01F 27/2828* (2013.01);
(Continued)

(58) Field of Classification Search
CPC .................................................. H01F 27/2828
(Continued)

(56) References Cited

U.S. PATENT DOCUMENTS

2014/0333401 A1 11/2014 Esaki et al.
2015/0035634 A1* 2/2015 Nakamura ............ H01F 41/046 336/170
(Continued)

FOREIGN PATENT DOCUMENTS

CN 108231339 A 6/2018
JP 2015-144166 A 8/2015
(Continued)

OTHER PUBLICATIONS

Office Action issued in corresponding Korean Application No. 10-2020-0006393 dated Apr. 13, 2021, with English translation.
(Continued)

*Primary Examiner* — Ronald Hinson
(74) *Attorney, Agent, or Firm* — MORGAN. LEWIS & BOCKIUS LLP

(57) ABSTRACT

A coil component includes a wound coil having a winding portion, including at least one turn, and a lead-out portion extending from an end portion of the winding portion to form a separation space, together with the winding portion, the wound coil being formed of a metal wire having a surface on which an insulating coating portion is disposed, a body embedding the wound coil therein and including magnetic powder particles and an insulating resin, and an insulating layer disposed on at least one of a surface of the winding portion and a surface of the lead-out portion forming the separation space.

21 Claims, 13 Drawing Sheets

E

(51) Int. Cl.

| | |
|---|---|
| ***H01F 27/28*** | (2006.01) |
| ***H01F 27/29*** | (2006.01) |
| ***H01F 17/04*** | (2006.01) |
| ***H01F 27/32*** | (2006.01) |

(52) U.S. Cl.
CPC ........... *H01F 27/292* (2013.01); *H01F 27/32* (2013.01); *H01F 2017/048* (2013.01)

(58) Field of Classification Search
USPC .......................................................... 336/200
See application file for complete search history.

(56) References Cited

U.S. PATENT DOCUMENTS

| | | | | |
|---|---|---|---|---|
| 2015/0255208 | A1 | 9/2015 | Kim et al. | |
| 2017/0032882 | A1* | 2/2017 | Yang | H01F 27/2804 |
| 2018/0114631 | A1* | 4/2018 | Ida | H01F 27/324 |
| 2018/0182531 | A1* | 6/2018 | Muneuchi | H01F 27/255 |
| 2019/0304669 | A1 | 10/2019 | Hirama et al. | |
| 2020/0075219 | A1* | 3/2020 | Matsumoto | H01F 27/2852 |

FOREIGN PATENT DOCUMENTS

| | | | |
|---|---|---|---|
| JP | 6090164 | B2 | 2/2017 |
| JP | 2019-186279 | A | 10/2019 |
| KR | 10-2018-0045836 | A | 5/2018 |
| KR | 10-2018-0073488 | A | 7/2018 |

OTHER PUBLICATIONS

Chinese Office Action dated Dec. 6, 2023 issued in Chinese Patent Application No. 202011186397.X (with English translation).

* cited by examiner

COIL COMPONENT

CROSS-REFERENCE TO RELATED APPLICATION(S)

This application claims the benefit under 35 USC 119 (a) of Korean Patent Application No. 10-2020-0006393 filed on Jan. 17, 2020 in the Korean Intellectual Property Office, the entire disclosure of which is incorporated herein by reference for all purposes.

TECHNICAL FIELD

The present disclosure relates to a coil component.

BACKGROUND

An example of a coil component is a wound coil component using a wound coil.

A wound coil forms a winding portion by winding a metal wire, having an insulating coating layer formed on a surface thereof, two or more times (first processing). When the first processing is completed, both ends of the metal wire extend from both ends of the winding portion to be parallel to each other, respectively. Both ends of the first-processed metal wire are bent in a direction perpendicular to a direction in which they extend (second processing, forming process).

Due to external force of the above-mentioned forming process, the insulating coating layer between an outermost turn of the winding portion and both ends of the metal wire may be damaged, and the metal wire of the winding portion may be exposed outwardly within a corresponding region.

SUMMARY

An aspect of the present disclosure is to provide a coil component which may reduce a leakage current.

According to an aspect of the present disclosure, a coil component includes a wound coil having a winding portion, including at least one turn, and a lead-out portion extending from an end portion of the winding portion to form a separation space, together with the winding portion, the wound coil being formed of a metal wire having a surface on which an insulating coating portion is disposed, a body embedding the wound coil therein and including magnetic powder particles and an insulating resin, and an insulating layer disposed on at least one of a surface of the winding portion and a surface of the lead-out portion forming the separation space.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
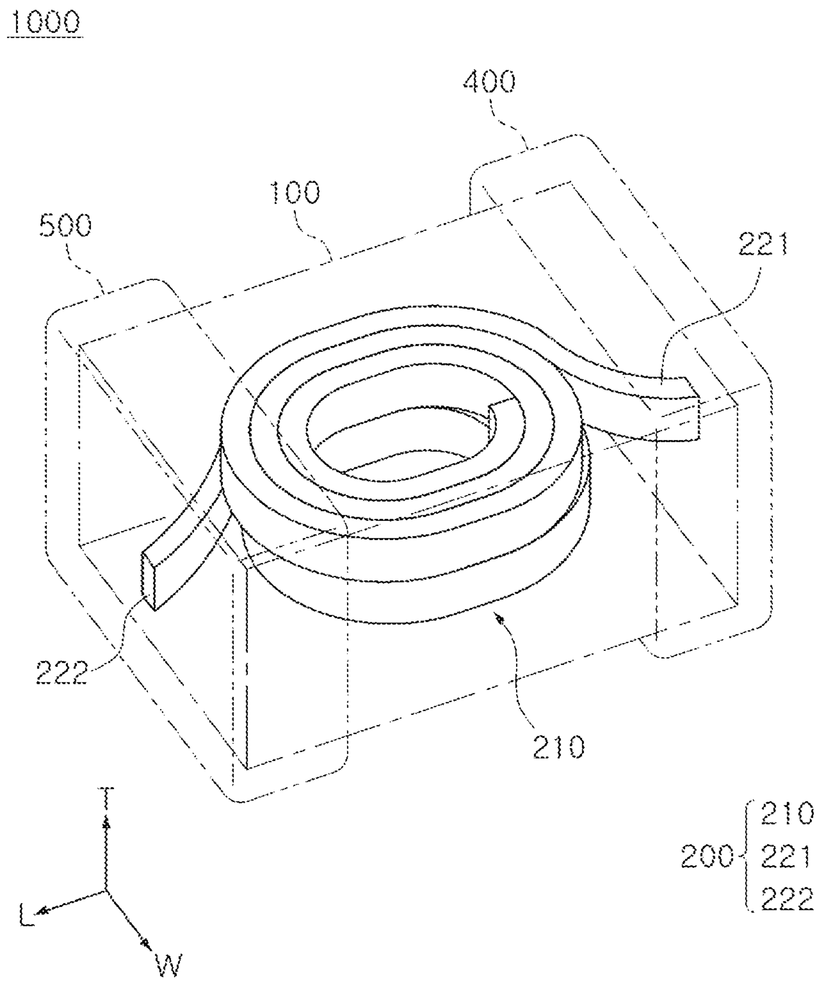
FIG. 1 is a schematic diagram of a coil component according to a first embodiment of the present disclosure.

The terms used in the description of the present disclosure are used to describe a specific embodiment, and are not intended to limit the present disclosure. A singular term includes a plural form unless otherwise indicated. The terms “include,” “comprise,” “is configured to,” etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms “disposed on,” “positioned on,” and the like, may indicate that an element is positioned on or beneath an object, and does not necessarily mean that the element is positioned above the object with reference to a gravity direction.

The term “coupled to,” “combined to,” and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, an L direction is a first direction or a length (longitudinal) direction, a W direction is a second direction or a width direction, a T direction is a third direction or a thickness direction.

Hereinafter, a coil component according to an example embodiment of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component may be used as a power inductor, a high frequency (HF) inductor, a general bead, a high frequency (GHz) bead, a common mode filter, and the like.

First Embodiment

Figure 2:
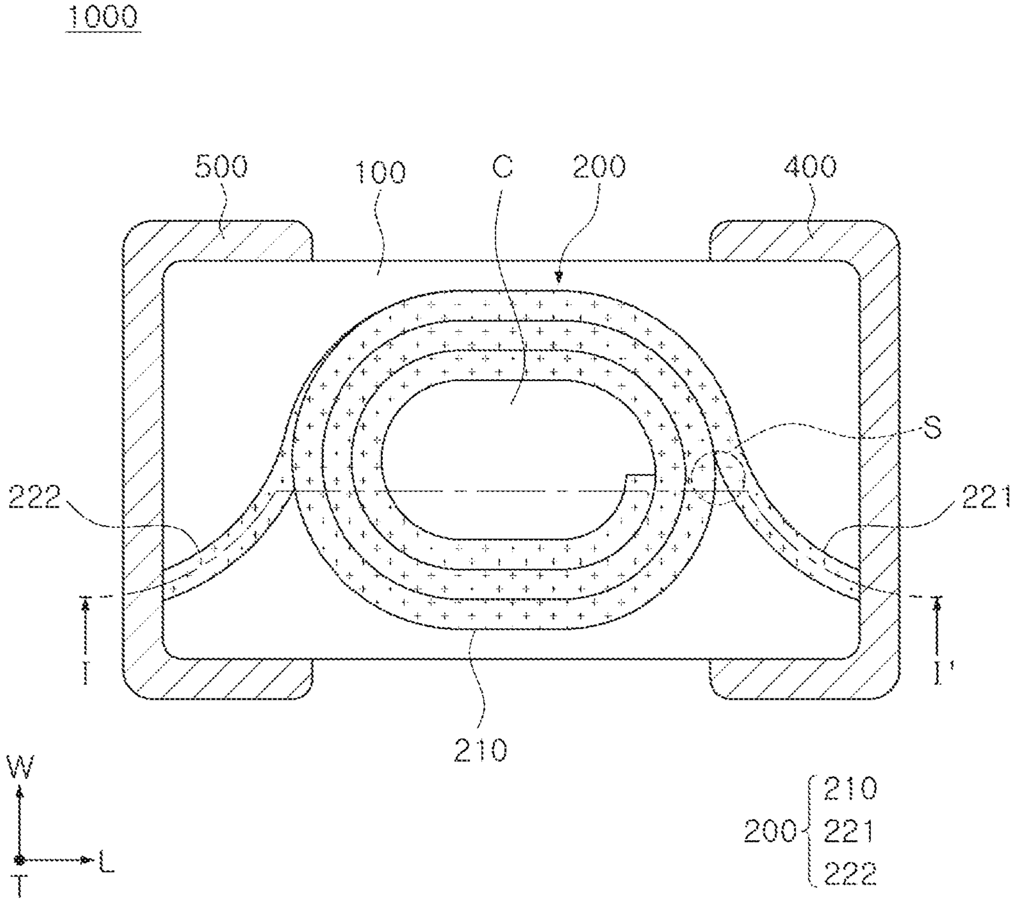
FIG. 2 is a plan view of FIG. 1.
Figure 3:
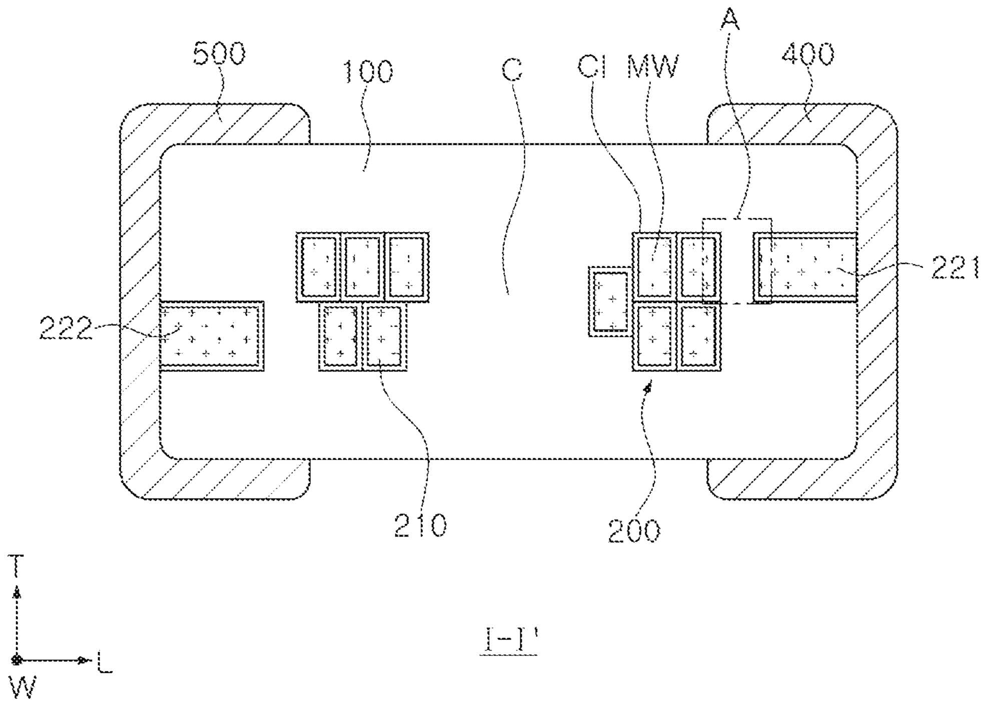
FIG. 3 is a cross-sectional view taken along line I-I' in FIG. 2.
Figure 4:
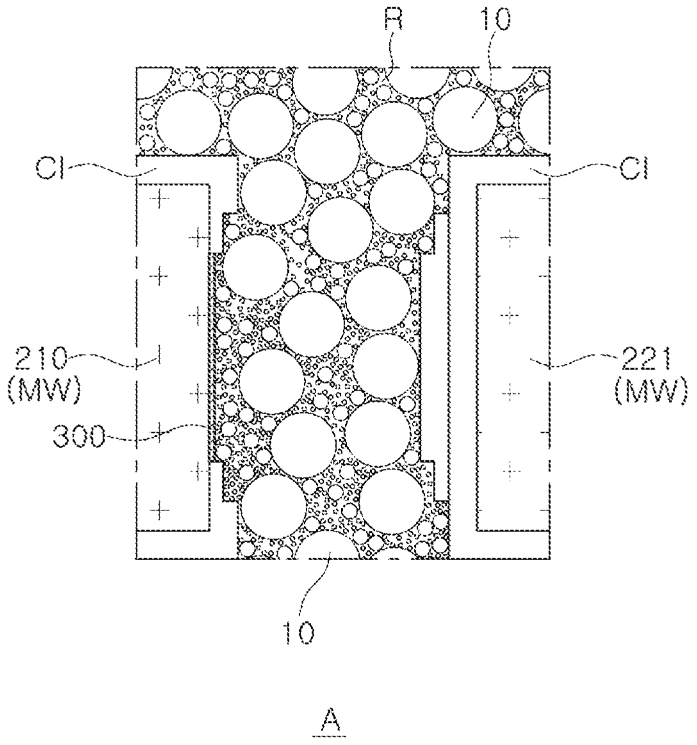
FIG. 4 is an enlarged view of portion ‘A’ of FIG. 3.
Figure 5:
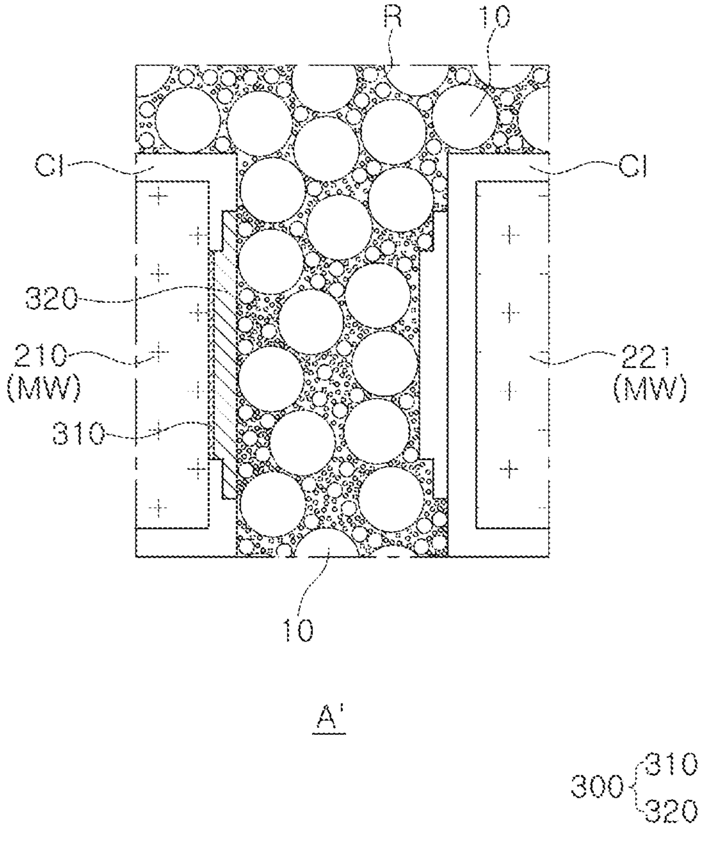
FIG. 5 illustrates a modified example of an insulating layer and corresponds to FIG. 4.

FIG. 1 is a schematic diagram of a coil component according to a first embodiment of the present disclosure. FIG. 2 is a plan view of FIG. 1. FIG. 3 is a cross-sectional view taken along line I-I' in FIG. 2. FIG. 4 is an enlarged view of portion ‘A’ of FIG. 3. FIG. 5 illustrates a modified example of an insulating layer and corresponds to FIG. 4. In FIG. 2, a portion of components are visibly illustrated for the description of the present disclosure.

Referring to FIGS. 1 to 5, a coil component 1000 according to an example embodiment includes a body 100, a wound coil 200, an insulating layer 300, and external electrodes 400 and 500.

The body 100 may form an exterior of the coil component 1000, and may embed the wound coil 200 therein.

The body 100 may be formed to have a hexahedral shape overall.

Based on FIG. 1, the body 100 has a first surface and a second surface opposing each other in a length direction L, a third surface and a fourth surface opposing each other in a width direction W, and a fifth surface and a sixth surface opposing each other in a thickness direction T. Each of the first to fourth surfaces of the body 100 may correspond to a wall surface of the body 100 connecting the fifth surface and the sixth surface of the body 100. Hereinafter, both end surfaces of the body 100 may refer to the first surface and the second surface of the body 100, respectively, both side surfaces of the body 100 may refer to the third surface 103 and the fourth surface 104 of the body 100, respectively, and one surface and the other surface of the body 100 may refer to the sixth surface and the fifth surface of the body 100, respectively.

The body 100 may be formed such that the coil component 1000, including the external electrodes 400 and 500 to be described later, has a length of 2.0 mm, a width of 1.2 mm, and a thickness of 0.65 mm, but is not limited thereto.

The body 100 includes magnetic powder particles 10 and an insulating resin R. As an example, the body 100 may be formed by laminating a magnetic composite sheet, having a structure in which the magnetic powder particles 10 are disposed in the insulating resin R, on the wound coil 200 to be described later. As another example, the body 100 may be formed by locating the wound coil 200 in a mold and filling the mold with a magnetic composite material including the magnetic powder particles 10 and the insulating resin R. In the above-mentioned examples, a core C of the body 100 may be formed by filling an empty space of a winding portion 210 of the wound coil 200 to be described later, with a magnetic composite sheet or a magnetic composite material, but a method of forming the core C is not limited thereto.

The magnetic powder particles 10 may be ferrite powder particles or magnetic metal powder particles.

Examples of the ferrite powder particles may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The magnetic metal powder particle may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

Hereinafter, it will be assumed that the magnetic powder particles 10 are magnetic metal powder particles, but the present disclosure is not limited thereto.

The magnetic metal powder particle may be amorphous or crystalline. For example, the magnetic metal powder particle may be a Fe—Si—B—Cr-based amorphous alloy powder, but is not limited thereto.

Each of the magnetic metal powder particles 10 may have an average diameter of about 0.1 μm to 50 μm, but is not limited thereto.

The metal magnetic power particle 10 may include an insulating coating layer formed on a surface thereof. Since the magnetic metal powder particles 10 themselves may have conductivity, the insulating coating layer may surround the surface of the magnetic metal powder particle 10 to prevent short-circuiting of the magnetic metal powder particles 10. The insulating coating layer may include an epoxy, a polyimide, a liquid crystal polymer, or the like, in a single form or in combined forms, but is not limited thereto. For example, a material and a forming method of the insulating coating layer may vary as long as the insulating coating layer may be formed of an electrically insulating material on the surface of the magnetic metal powder particle 10.

The body 100 may include two or more types of magnetic metal powder particles 10. In this case, the term “different types of magnetic metal powder particles” means that the magnetic powder particles are distinguished from each other by diameter, composition, crystallinity, and a shape. In FIG. 4, the body 100 is illustrated as including three types of magnetic metal powder particles 10 having different particle size distributions to each other (trimodal). However, since this is merely illustrative, the body 100 may include two types of magnetic metal powder particles 10 having different particle size distributions to each other (bimodal). Since the body 100 includes two or more types of magnetic metal powder particles 10 having different particle size distributions to each other, a volume of the magnetic metal powder particles 10 in the body 100 may be increased based on the body 100 having the same volume (increased in filling rate).

The insulating resin R may include an epoxy, a polyimide, a liquid crystal polymer, or the like, in a single form or in combined forms, but is not limited thereto.

The wound coil 200 is embedded in the body 100 to exhibit characteristics of the coil component. For example, when the coil component 1000 according to this embodiment is used as a power inductor, the wound coil 200 may serve to stabilize the power supply of an electronic device by storing an electric field as a magnetic field and maintaining an output voltage.

The wound coil 200 includes the winding portion 210, an air-cored coil, and lead-out portions 221 and 222, respectively extending from both ends of the winding portion 210 to be exposed to the first and second surfaces of the body 100.

The winding portion 210 may be formed by winding a metal wire MW, such as a copper wire having a surface covered with an insulating coating portion CI in a spiral shape. As a result, each turn of the winding portion 210 has a form covered with an insulating coating portion CI. The winding portion 210 may include at least one layer. Each layer of the winding portion 210 is formed to have a planar spiral shape, and may have at least one turn.

The lead-out portions 221 and 222 extend from both end portions of the winding portion 210 to be exposed to the first and second surfaces of the body 100, respectively. The lead-out portions 221 and 222 may be integrated with the winding portion 210. The winding portion 210 and the lead-out portions 221 and 222 may be integrated with each other using the metal wire MW coated with the insulating coating portion CI. The lead-out portions 221 and 222 may be both end portions of the metal wire MW coated with the insulating coating portion CI.

In the case of a wound coil applied to a wound coil component, a metal wire having an insulation-coated surface may be wound by a winder to form a winding portion having at least one turn (first processing). The first-processed metal wire may have both end portions, respectively extending from an outermost turn of the winding portion and extending in substantially the same direction to be parallel to each other. When the wound coil, in which both end portions of the metal wire are disposed parallel to each other, is embedded in the body, both of the first and second lead-out portions of the wound coil may be exposed on one surface of the body. Accordingly, a process of increasing a distance between both of the end portions of the first-processed metal wire may be performed to expose the first and second lead-out portions of the wound coil to both surfaces of the body opposing each other, respectively (second processing, forming process).

In the second processing, since external force is applied to both end portions of the metal wire in a direction in which both end portions of the metal wire oppose each other, one area of an outermost turn of the winding portion and one area of both end portions of the metal wire, disposed to be in contact with each other, are separated from each other. However, in the process, an insulating coating portion of one region of the outermost turn of the winding portion and/or one region of each of both end portions of the metal wire may be damaged to expose the metal wire to an external entity. In the case in which the insulating coating portion is damaged, when the body surrounding the wound coil includes conductive magnetic metal powder particles, a leakage current may be generated to deteriorate component characteristics.

In this embodiment, to address the above-described issue, an insulating layer 300 is disposed on at least one of a surface of the winding portion 210 and surfaces of the lead-out portions 221 and 222 forming a separation space S. For example, since the metal wire MW may be exposed to the separation space S, an insulating layer may be disposed on at least one of a surface of the winding portion 210 and surfaces of the lead-out portions 221 and 222, forming a separation space, to prevent the metal wire MW from being in direct contact with the magnetic metal powder particles 10.

In this specification, "the separation space S between the winding portion 210 and the first lead-out portion 221" may refer to, for example, a fan-shaped region formed by, based on a cross section in a length-width direction (L-W), a tangent of each of the winding portion 210 and the first lead-out portion on a contact point between the winding portion 210 and the first lead-out portion 221 and a circle centering on the contact point and having a radius, an average diameter of a magnetic metal powder particle having a largest diameter, among the plurality of magnetic metal powder particles (for example, a circle having a radius of 50 μm or less when $D_{50}$ of a magnetic metal powder particle 10 having a largest diameter is 50 μm). Alternatively, "the separation space between the winding portion 210 and the first lead-out portion 221" may refer to a region between a surface of the winding portion 210, including the entirety of the fan-shaped region, and a surface of the first lead-out portion 221, based on a cross section in a length-width (L-W) direction. Alternatively, "the separation space between the winding portion 210 and the first lead-out portion 221" may refer to a region between a surface of the winding portion 210, including a portion of the fan-shaped region, and a surface of the first lead-out portion 221, based on a cross section in a length-width (L-W) direction.

The above-described meaning may also be applied to the separation space S between the winding portion 210 and the second lead-out portion 222. Hereinafter, a description will be given while focusing on the separation space S between the winding portion 210 and the first lead-out portion 221, but the description will be equivalently applied to a separation space S between the winding portion 210 and the second lead-out portion 222.

The insulating layer 300 may include a metal oxide layer disposed on a surface of the metal wire MW exposed to the separation space S. The metal oxide layer may be formed by forming a metal oxide layer having electrical insulation on at least one of the surface of the winding portion 210 and the surface of the first lead-out portion 221 forming the separation space S of the second-processed wound coil 200. Type of a contained metal (or metal ions) and a forming method of the metal oxide layer are not limited as long as it has electrical insulation and includes a metal. In one example, a thickness of the insulating layer 300 may be less than a thickness of the insulating coating portion CI, but the thickness relation is not limited thereto. In one example, the insulating layer 300 and the insulating coating portion CI may be made of different insulating materials, but the materials for forming the insulating layer 300 and the insulating coating portion CI are not limited thereto. As a non-limiting example, when the metal wire MW is a copper wire, the metal oxide layer may be a copper oxide layer, and the copper oxide layer may be formed by oxidizing an exposed surface of the exposed copper wire. In this case, a process may be simplified as compared with a case in which an additional metal oxide layer is performed, and bonding force between the metal wire MW and the metal oxide layer may be increased because the metal wire MW and the metal oxide layer include the same metal. In addition, the metal oxide layer may be selectively formed only on the exposed surface of the metal wire MW. Although not illustrated in the drawings, when the metal oxide layer is formed by another method, rather than the oxidation treatment of the exposed surface of the metal wire MW, the metal oxide layer 310 may extend not only to the exposed surface of the metal wire MW, but also upwardly of at least a portion of the insulating coating portion CI.

Referring to FIG. 5, an insulating layer 300 applied to a modified example may further include a metal oxide layer 310 and a resin insulating layer 320. Cracking may occur in the metal oxide layer 310 to generate a leakage current. In this modified example, after forming the metal oxide layer 310, the resin insulating layer 320 may be additionally formed on the metal oxide layer 310 to more reliably prevent a leakage current. The resin insulating layer 320 may be formed by applying an insulating resin for forming a resin insulating layer or forming a layer of the insulating resin on one of the surface of the winding portion 210 and the surface of the first lead-out portion 221 forming the separation space S of the winding coil on 200 on which a process of forming the metal oxide layer 310 is performed. The resin insulating layer 320 may include the same resin as the insulating resin R included in the body 100, but the scope of the present disclosure is not limited thereto. When the resin insulating layer 320 includes the same resin as the insulating resin R included in the body 100, the bonding force between the body 100 and the winding coil 200 may be improved.

The external electrodes 400 and 500 are disposed on the first and second surfaces of the body 100 to be in contact with and connected to the lead-out portions 221 and 222, respectively. Specifically, the first external electrode 400 is disposed on the first surface of the body 100 to be connected to the first lead-out unit 221, and the second external electrode 500 is disposed on the second surface of the body 100 to be connected to the second lead-out unit 222.

Each of the external electrodes 400 and 500 may be formed of a conductive material such as copper (Cu), aluminum (Al), silver (Ag), tin (Sn), gold (Au), nickel (Ni), lead (Pb), chromium (Cr), titanium (Ti), or alloys thereof, but a material thereof is not limited thereto.

Each of the external electrodes 400 and 500 may be formed to have a single-layer structure or a multilayer structure. For example, the first external electrode 200 may include a first layer including copper (Cu), a second layer disposed on the first layer and including nickel (Ni), and a third layer disposed on the second layer and including tin (Sn). Each of the first to third layers may be formed by electroplating, but a forming method thereof is not limited thereto. Each of the external electrodes 400 and 500 may include a conductive resin layer and an electroplating layer. The conductive resin layer may be formed by applying and curing conductive powder particles, including silver (Ag) and/or copper (Cu), and a conductive paste including an insulating resin such as epoxy, or the like.

Second Embodiment

Figure 6:
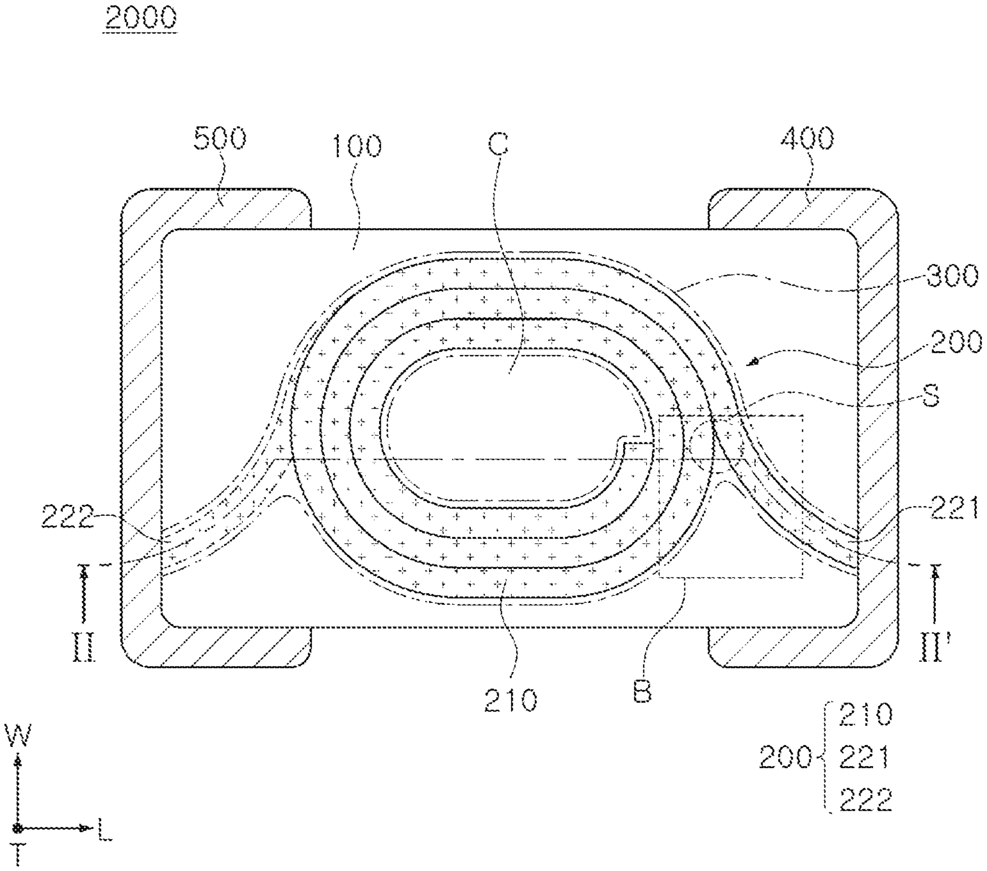
FIG. 6 is a schematic diagram of a coil component according to a second embodiment of the present disclosure and corresponds to FIG. 2.
Figure 7:
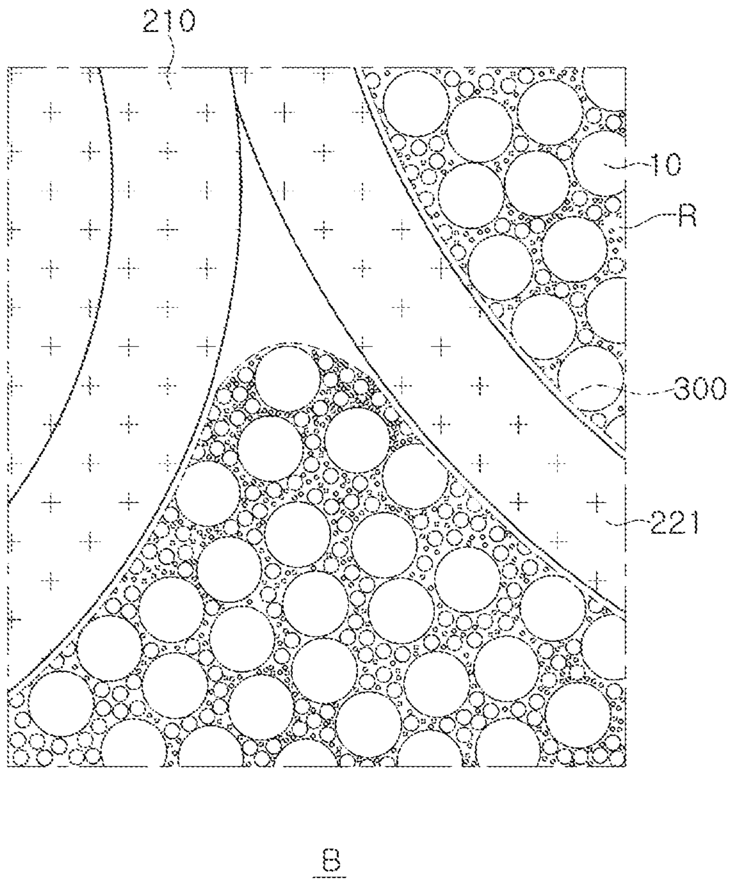
FIG. 7 is an enlarged view of portion ‘B’ of FIG. 6.
Figure 8:
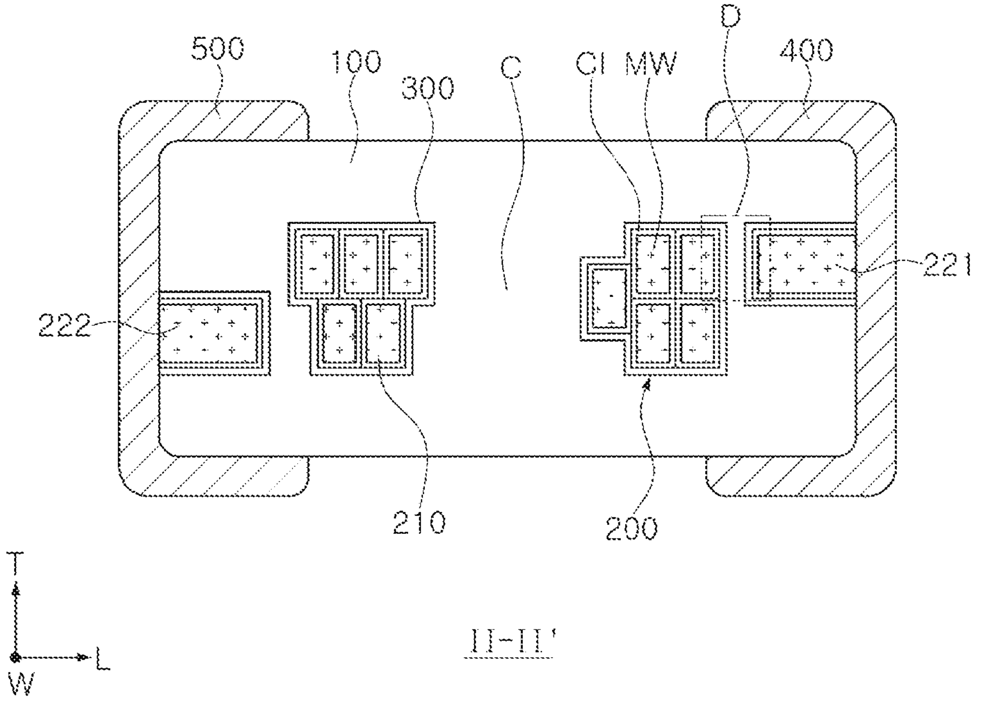
FIG. 8 is a cross-sectional view taken along line II-II' in FIG. 6.
Figure 9:
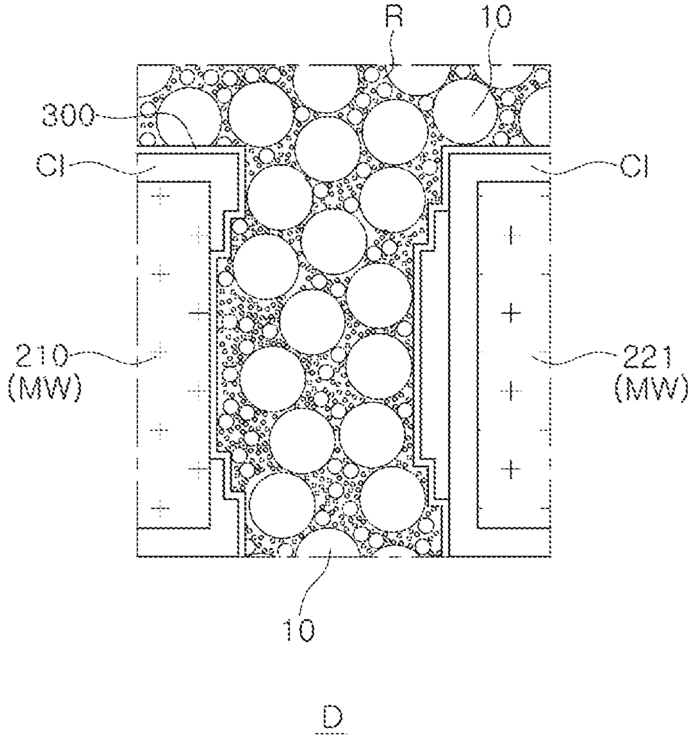
FIG. 9 is an enlarged view of portion ‘D’ of FIG. 8.

FIG. 6 is a schematic diagram of a coil component according to a second embodiment of the present disclosure and corresponds to FIG. 2. FIG. 7 is an enlarged view of portion 'B' of FIG. 6. FIG. 8 is a cross-sectional view taken along line II-II' in FIG. 6. FIG. 9 is an enlarged view of portion 'D' of FIG. 8.

Referring to FIGS. 1 to 5 and FIGS. 6 to 9, when comparing a coil component 2000 according to this embodiment with the coil component 1000 according to the first embodiment, locations of insulating layers 300 are different from each other. Therefore, in the description of this embodiment, descriptions will be given while focusing on the location of the insulating layer 300. The description of the first embodiment will be equivalently or similarly applied to the other components of this embodiment.

Referring to FIGS. 6 to 9, the insulating layer 300 is disposed to surround a surface of a wound coil 200 including a separation space S. For example, the insulating layer 300 is interposed between all surfaces of the wound coil 200 and the body 100. The insulating layer 300 may be formed by dipping the wound coil 200, on which second processing is completed, in a liquid insulating resin, but the scope of the present disclosure is not limited thereto. The insulating layer 300 may include the same resin as an insulating resin R of the body 100, but the scope of the disclosure is not limited thereto. When the insulating layer 300 and the body 100 include the same resin, bonding force between the insulating layer 300 and the body 100 may be improved.

In the wound coil 200, the metal wire MW may also be exposed to an external entity in a region, other than a region in which the separation space S is formed, during the first processing and/or the second processing. In this embodiment, the insulating layer 300 may be formed to surround all surfaces of the wound coil 200 to further improve a leakage current reduction effect. Moreover, in the case of this embodiment, the insulating layer 300 may be formed by a simpler method.

Third Embodiment

Figure 10:
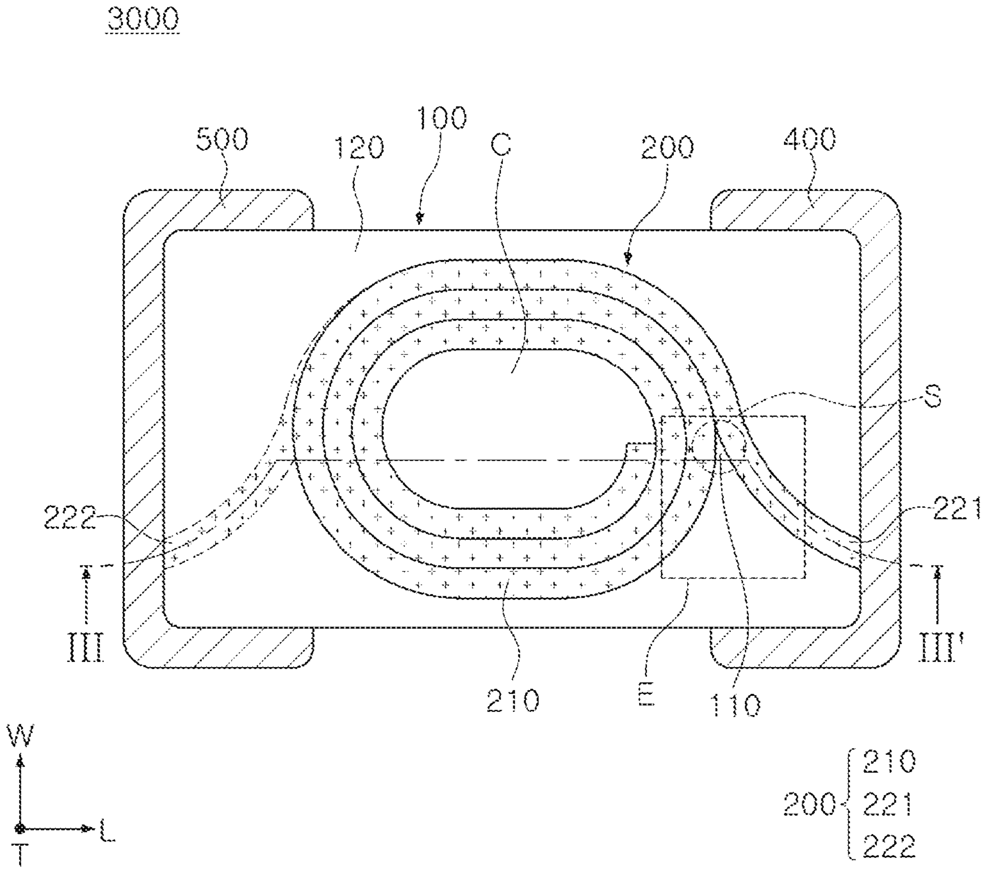
FIG. 10 is a schematic diagram of a coil component according to a third embodiment of the present disclosure and corresponds to FIG. 2.
Figure 11:
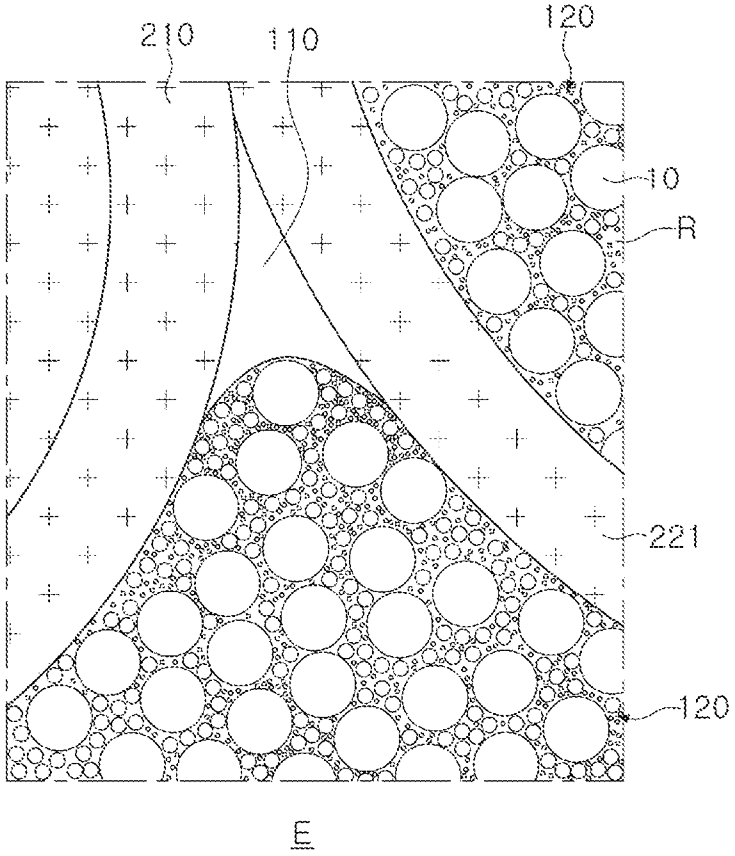
FIG. 11 is an enlarged view of portion ‘E’ of FIG. 10.
Figure 12:
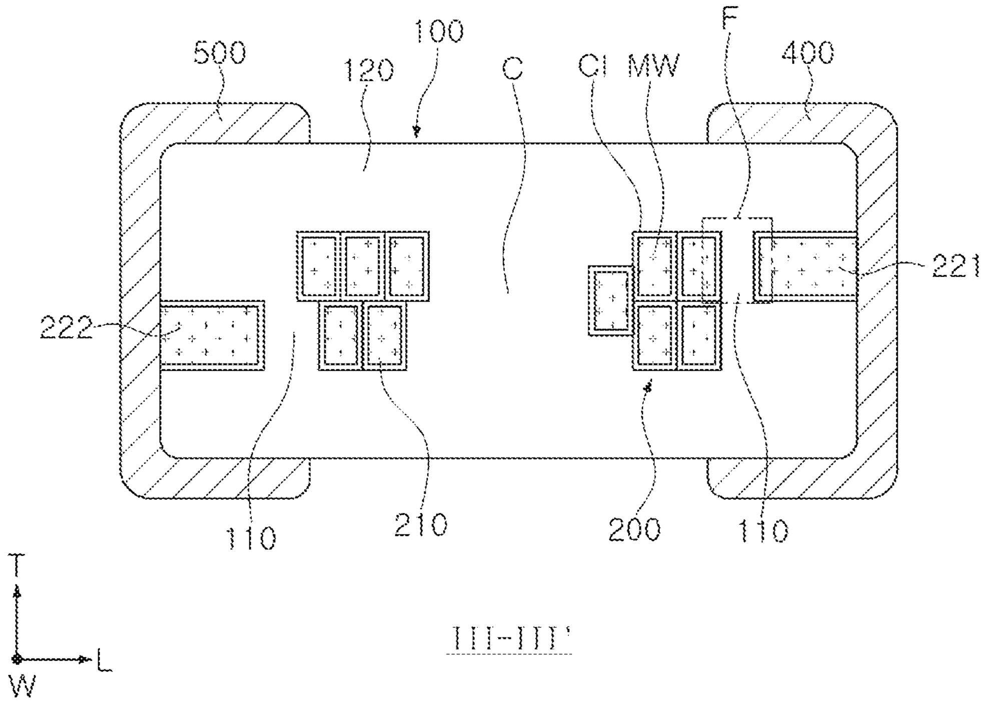
FIG. 12 is cross-sectional view taken along line III-III' of FIG. 10.
Figure 13:
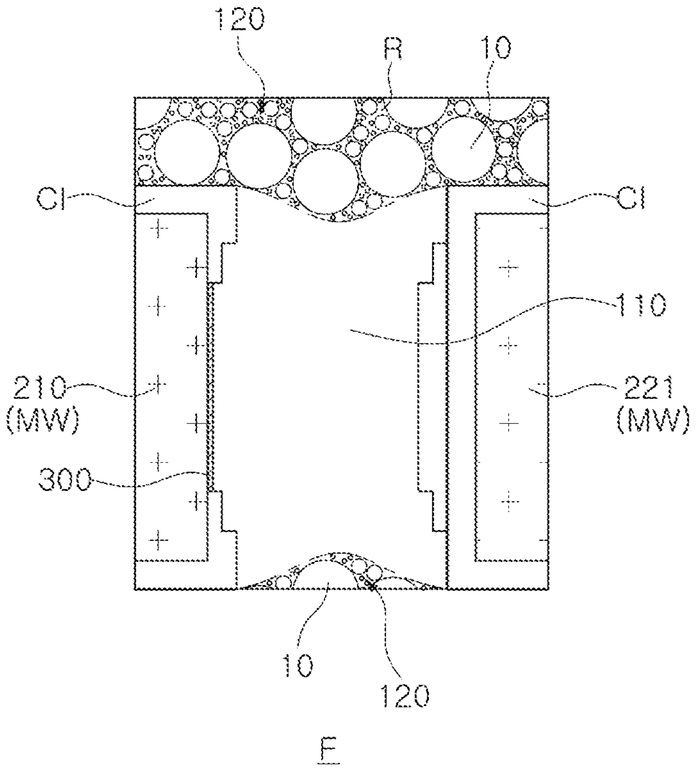
FIG. 13 is an enlarged view of portion ‘F’ of FIG. 12.

FIG. 10 is a schematic diagram of a coil component according to a third embodiment of the present disclosure and corresponds to FIG. 2. FIG. 11 is an enlarged view of portion 'E' of FIG. 10. FIG. 12 is cross-sectional view taken along line of FIG. 10. FIG. 13 is an enlarged view of portion 'F' of FIG. 12.

Referring to FIGS. 1 to 5 and FIGS. 10 to 13, when comparing a coil component 3000 according to this embodiment with the coil component 1000 according to the first embodiment, bodies 100 are different from each other. Therefore, in the description of this embodiment, description will be given while focusing on the body 100. The description of the first embodiment will be equivalently or similarly applied to the other components of this embodiment.

Referring to FIGS. 10 to 13, the body 100 has a low-density portion 110, filling a separation space S, and a high-density portion 120 disposed outside of the low-density portion 110 and having higher density of magnetic powder particles than the low-density portion 110.

The low-density portion 110 and the high-density portion 120 may be formed by, for example, forming a high-density portion forming material on an upper portion and a lower portion of the wound coil after filling the separated space between the winding portion 210 of the second-processed wound coil 200 with a low-density portion forming material. The low-density portion forming material and the high-density portion forming material may each include the same curable insulating resin and/or different curable insulating resins, and may be first and second magnetic composite resins having different filling rates of metallic magnetic powder particles. A first magnetic composite resin, the low-density portion forming material, has a lower filling rate of the metallic magnetic powder particles 10 than a second magnetic composite resin, the high-density portion forming material. Therefore, the density of the magnetic metal powder particles 10 in the first magnetic composite resin may be lower than the density of the magnetic metal powder particles 10 in the second magnetic composite resin, the high-density portion forming material, and the high-density portion forming material may be a magnetic composite sheet including the second magnetic composite resin. In the above example, when the insulating resin included in each of the low-density portion forming material and the high-density portion forming material is the same resin or a curable resin capable of being cross-linked to each other, the low-density portion 110 and the high-density portion 120 of the body 100 may be integrated with each other, and thus, a boundary may not be vertically formed.

As another example, the low-density portion forming material may not include the magnetic metal powder particles 10, and only the high-density portion forming material may include the magnetic metal powder particles 10. In this case, the metallic magnetic powder particles 10, included in the high-density portion forming material, may be prevented from flowing into the separated space during a process of laminating and curing the high-density portion forming material on the upper and lower portions of the wound coil 200. When the low-density portion forming material includes an insulating resin, the insulating resin included in the low-density portion forming material may have a melting point lower than a curing temperature of the insulating resin included in the high-density portion forming material. The insulating resin included in the low-density portion forming material may be, for example, a wax having a melting point lower than a curing temperature of an epoxy resin included in the high-density portion forming material, but the scope of the present disclosure is limited thereto. The insulating resin included in the low-density portion forming material may be melted during a curing process of forming the body 100 to decrease concentration (density) in a direction toward the surface of the body 100 from the separation space S.

In the above-described examples, when the low-density portion forming material is a liquid material, the low-density portion forming material disposed in the separation space may have an inwardly curved shape in a direction toward a contact point between the winding portion 210 and the first lead-out portion 221 due to surface tension of the low-density portion forming material, a liquid material. Therefore, as illustrated in FIG. 11, the low-density portion 110, filling the separation space S, may have an inwardly curved shape in a direction toward the contact point between the winding portion 210 and the first lead-out portion 221. In addition, as illustrated in FIG. 13, a central portion of the low-density portion 110 may be depressed toward a center of a thickness direction of the separation space S.

In FIGS. 11 and 13, the low-density portion 110 is illustrated as not including the magnetic metal powder particles 10. However, this is merely illustrative for understanding of the present disclosure and ease of description. Therefore, the scope of the present disclosure is not limited to an example of the low-density portion 110 illustrated in FIGS. 11 and 13.

In the coil component 3000 according to this embodiment, the low-density portion 110 having relatively low density of the metallic magnetic powder particles 10 may fill the separation space between the winding portion 210 and the lead-out portions 221 and 222, in which there is high possibility that a leakage current is generated, to reduce a leakage current.

As described above, according to example embodiments, a leakage current of a coil component may be reduced.

While example embodiments have been shown and described above, it will be apparent to those skilled in the art that modifications and variations could be made without departing from the scope of the present disclosure as defined by the appended claims.

What is claimed is:

1. A coil component comprising:

a wound coil having a winding portion including a plurality of turns and a lead-out portion extending from an end portion of the winding portion to provide a separation space, together with the winding portion, the wound coil including a metal wire having a surface on which an insulating coating portion is disposed, wherein each of the plurality of turns of the winding portion includes an upper surface, a lower surface, and a side surface connecting the upper surface and the lower surface to each other;

a body embedding the wound coil therein and including magnetic powder particles and an insulating resin; and an insulating layer disposed on at least one of the side surface of an outermost turn of the plurality of turns of the winding portion and a surface of the lead-out portion providing the separation space, wherein the insulating layer is spaced apart from the side surface of one inner turn of the plurality of turns of the winding portion facing the side surface of another inner turn of the plurality of turns of the winding portion, and the insulating coating portion covers the side surface of the one inner turn of the plurality of turns of the winding portion facing the side surface of the another inner turn of the plurality of turns of the winding portion, and also covers the upper surface or the lower surface of the one inner turn of the plurality of turns of the winding portion.

2. The coil component of claim 1, wherein the insulating layer is disposed to surround a surface of the wound coil.

3. The coil component of claim 1, wherein the insulating layer includes the same resin as the insulating resin of the body.

4. The coil component of claim 1, wherein the magnetic powder particles include conductive magnetic metal powder particles.

5. The coil component of claim 1, wherein a thickness of the insulating coating portion is different from a thickness of the insulating layer.

6. The coil component of claim 1, wherein a material of the insulating coating portion is different from a material of the insulating layer.

7. The coil component of claim 1, wherein the insulating coating portion covers the upper surface and the lower surface of the one inner turn of the plurality of turns of the winding portion.

8. The coil component of claim 1, wherein a portion of the metal wire is exposed from the insulating coating portion and faces the separation space, and the insulating layer is disposed on an exposed surface of the metal wire.

9. The coil component of claim 8, wherein the insulating layer includes a metal oxide layer.

10. The coil component of claim 9, wherein the metal oxide layer includes a metal included in the metal wire.

11. The coil component of claim 10, wherein the metal oxide layer is only disposed on the exposed surface of the metal wire.

12. The coil component of claim 9, wherein a thickness of the metal oxide layer is less than a thickness of the insulating coating portion.

13. The coil component of claim 9, wherein the insulating layer further includes a resin insulating layer disposed on the metal oxide layer.

14. The coil component of claim 1, wherein the body has a low-density portion, disposed in the separation space, and a high-density portion disposed outside of the low-density portion and having density of the magnetic powder particles higher than that of the low-density portion.

15. The coil component of claim 14, wherein the low-density portion includes a low-melting-point resin having a melting point lower than a curing temperature of the insulating resin of the body.

16. The coil component of claim 14, wherein the low-density portion and the high-density portion are integrated with each other.

17. A coil component comprising:

a wound coil including a metal wire having a surface on which an insulating coating portion is disposed, and having a winding portion including a plurality of turns and a lead-out portion extending from an end portion to provide a separation space, together with the winding portion, wherein each of the plurality of turns of the winding portion includes an upper surface, a lower surface, and a side surface connecting the upper surface and the lower surface to each other;

a body including magnetic metal powder particles and an insulting resin and embedding the wound coil therein; and an insulating layer disposed on an exposed surface of the metal wire exposed from the insulating coating portion, and facing the separation space, wherein the insulating layer is spaced apart from the side surface of one inner turn of the plurality of turns of the winding portion facing the side surface of another inner turn of the plurality of turns of the winding portion, and the insulating coating portion covers the side surface of the one inner turn of the plurality of turns of the winding portion facing the side surface of the another inner turn of the plurality of turns of the winding portion metal wire, and also covers the upper surface or the lower surface of the one inner turn of the plurality of turns of the winding portion.

18. The coil component of claim 17, wherein the insulating layer includes a metal oxide layer including the same metal as the metal wire and disposed on only the exposed surface of the metal wire.

19. The coil component of claim 17, wherein a thickness of the insulating coating portion is different from a thickness of the insulating layer.

20. The coil component of claim 17, wherein a material of the insulating coating portion is different from a material of the insulating layer.

21. The coil component of claim 17, wherein the insulating coating portion covers the upper surface and the lower surface of the one inner turn of the plurality of turns of the winding portion.

* * * * *